United States Patent
Watanabe (10) Patent No.: US 7,631,712 B2
(45) Date of Patent: Dec. 15, 2009

(54) MOUNTING STRUCTURE OF ELECTRICAL EQUIPMENT

(75) Inventor: Ko Watanabe, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 407 days.

(21) Appl. No.: 11/596,644

(22) PCT Filed: Apr. 28, 2005

(86) PCT No.: PCT/JP2005/008579

§ 371 (c)(1), (2), (4) Date: Nov. 16, 2006

(87) PCT Pub. No.: WO2006/022050

PCT Pub. Date: Mar. 2, 2006

(65) Prior Publication Data

US 2008/0274397 A1 Nov. 6, 2008

(30) Foreign Application Priority Data

Aug. 27, 2004 (JP) ............... 2004-248325

(51) Int. Cl.
*B60R 16/04* (2006.01)
(52) U.S. Cl. ...................... 180/68.5; 180/65.1
(58) Field of Classification Search ............... 180/68.5, 180/68.1, 68.2, 65.3, 65.1; 429/159, 149; 280/796, 783, 727

See application file for complete search history.

(56) References Cited

U.S. PATENT DOCUMENTS

| 5,704,644 | A | * | 1/1998 | Jaggi | 280/796 |
|---|---|---|---|---|---|
| 5,730,237 | A | * | 3/1998 | Matsuki et al. | 180/68.5 |
| 6,188,574 | B1 | * | 2/2001 | Anazawa | 180/68.5 |
| 6,264,260 | B1 | * | 7/2001 | Kronner et al. | 296/37.15 |
| 6,340,877 | B1 | | 1/2002 | Mita et al. | |
| 6,541,154 | B2 | * | 4/2003 | Oogami et al. | 429/159 |
| 6,631,775 | B1 | * | 10/2003 | Chaney | 180/68.5 |
| 6,662,891 | B2 | * | 12/2003 | Misu et al. | 180/68.1 |
| 6,902,020 | B2 | * | 6/2005 | Kronner et al. | 180/68.5 |
| 6,978,855 | B2 | * | 12/2005 | Kubota et al. | 180/65.3 |
| 7,051,825 | B2 | * | 5/2006 | Masui et al. | 180/68.5 |
| 7,240,752 | B2 | * | 7/2007 | Takahashi et al. | 180/68.1 |
| 7,353,900 | B2 | * | 4/2008 | Abe et al. | 180/68.5 |
| 7,424,926 | B2 | * | 9/2008 | Tsuchiya | 180/68.5 |

(Continued)

FOREIGN PATENT DOCUMENTS

EP 0 800 988 A1 10/1997

(Continued)

*Primary Examiner*—Hau V Phan
(74) *Attorney, Agent, or Firm*—Oliff & Berridge, PLC (57) ABSTRACT

A battery assy is mounted in a luggage room or beneath the rear seat. In the battery assy, a battery pack having a configuration of an approximate rectangle, when viewed from the side of the vehicle, is stored in an inclined manner in a casing formed of a battery cover and a lower case, having a configuration of an approximate parallelogram, when viewed from the side of the vehicle. A resin chamber is provided at a gap in the frontward position and the rearward position of the battery assy. A channel of cooling air is formed at a gap in the upper region and the lower region of the battery assy. The battery assy is mounted such that the bottom is protruding towards the front of the vehicle.

10 Claims, 8 Drawing Sheets

U.S. PATENT DOCUMENTS

2004/0226765 A1  11/2004  Mathews et al.

FOREIGN PATENT DOCUMENTS

| EP | 0 822 135 A | 2/1998 |
|---|---|---|
| EP | 1 188 659 A | 3/2002 |
| JP | A 2000-247278 | 9/2000 |
| JP | A-2002-373709 | 12/2002 |
| JP | A 2003-306045 | 10/2003 |
| JP | A 2004-001683 | 1/2004 |
| JP | A 2004-047426 | 2/2004 |
| JP | A 2004-058697 | 2/2004 |
| JP | A-2004-136767 | 5/2004 |

* cited by examiner

FRONT SIDE OF THE VEHICLE

11

100B

MOUNTING STRUCTURE OF ELECTRICAL EQUIPMENT

TECHNICAL FIELD

The present invention relates to electrical equipment (battery, capacitor, fuel cell, PCU (Power Control Unit) and the like) mounted on a vehicle, and more particularly, to the mounting structure of electrical equipment that requires cooling.

BACKGROUND ART

Vehicles of the type driven by a motor such as an electric car, a hybrid vehicle, a fuel cell vehicle and the like have a power supply unit including secondary batteries of relatively high capacity (battery pack) mounted. Such a battery pack obtains high voltage by the series connection of a plurality of batteries such as a lead storage battery, nickel metal hydride battery, lithium-ion battery, and the like.

An assembly type secondary battery (battery module) is generally employed for a battery pack. A battery module is configured having a plurality of (for example, 6) electric cells (for example, a battery cell having an output voltage of 1.2V) linked integrally so as to obtain the required power capacity (voltage value). A predetermined number of such battery modules are connected in series to constitute a battery pack that can provide a high voltage output of 200V to 300V.

In the battery pack, the plurality of battery modules of rectangular parallelepiped shape have their sides of larger width facing each other to be arranged in a stacked configuration. An end plate is abutted against the outer side of the cell of the battery modules located at either end. These end plates are bound by a restrain band to be connected together.

The configuration of a battery cell (for example, a nickel metal hydride battery) in a battery pack will be described hereinafter. Layers of a cathode plate and an anode plate are stacked with a separator therebetween to form a group of plates identified as a power generator element. The group of plates is accommodated in a cell together with an electrolyte. The opening of each cell is closed by a lid equipped with a safety valve. A lead is pulled out upwards from the upper end side of each cathode plate constituting the group of plates to be connected to a positive terminal. Similarly, a lead is pulled out upwards from the upper end of the other side of each anode plate to be connected to a negative terminal. These positive and negative terminals are attached to the lid.

In a battery pack, heat is generated by the chemical reaction occurring within the battery cell. This generated heat will induce deficiency such as reduction in the battery capacity and battery lifetime if the generated heat is neglected. In the case where battery modules are incorporated in a vehicle, a gap corresponding to a channel of air identified as a cooling medium is provided to deliver or draw in air from the interior or exterior of the vehicle, whereby the battery pack is cooled down.

Japanese Patent Laying-Open No. 2004-47426 discloses a cooling apparatus for a battery module cooling each secondary battery efficiently and uniformly while suppressing the height of the battery module and the cooling apparatus. This battery module cooling apparatus includes a cooling medium channel formed to pass a cooling medium in a lateral direction orthogonal to the vertical direction between each of the plurality of second batteries arranged in parallel in a battery module, and cooling medium feeding means for feeding a cooling medium towards the cooling medium channel. The cooling medium feeding means includes a pair of cooling medium introduction ducts at both the left and right sides of the battery module, having the outlet formed so as to feed the cooling medium alternately in opposite lateral directions with respect to each cooling medium channel, and cooling medium pressure feeding means for supplying the cooling medium to the two cooling medium introduction ducts.

In this battery module cooling apparatus, the cooling medium channel through which a cooling medium flows in the lateral direction is formed between the side faces of adjacent cuboid secondary batteries with a rectangular side face having a height larger than the thickness dimension and a lateral width larger than the height dimension. The cooling medium feeding means is provided to deliver the cooling medium towards the cooling medium channel. By the flow of a cooling medium to the cooling medium channel between respective rectangular side faces of the secondary batteries from the left and right directions of the battery module, each secondary battery of small thickness can be cooled effectively. Further, the height of the battery module including the cooling apparatus can be suppressed since cooling medium feeding means does not have to be provided above and below the battery module. This is advantageous from the standpoint of ensuring the space for mounting the battery module identified as the vehicle driving power supply.

Although the dimension in the direction of height of the secondary batteries can be suppressed in the battery module with the cooling apparatus disclosed in Japanese Patent Laying-Open No. 2004-47426, the following problems are noted. It is assumed that such formed secondary batteries are mounted on a vehicle with the arranged direction of the secondary batteries corresponding to the direction of width (transversing direction) of the vehicle (most usage applications correspond to this mounting direction). Although the mountability of the battery module above the floor panel and beneath the seat is favorable since the dimension in the direction of height is suppressed, the cooling medium channel disposed in the longitudinal direction of the vehicle, i.e. lengthways from the front to the back or from the back to the front of the vehicle, will have increased dimension in that direction. This means that, when the battery module is mounted beneath the front seat, the space in the neighborhood of the toes of the rider on the rear seat may become smaller. In the case where the battery module is mounted in the proximity of the rear wheel of a vehicle having two rows of seats, it may become an obstacle in taking out the spare tire stored in the recess provided at the floor panel.

Such a problem is not limited to a secondary battery, and is encountered common to secondary batteries (rechargeable batteries), capacitors, fuel cells, PCUs, and the like that require cooling by air or air circulation.

DISCLOSURE OF THE INVENTION

In view of the foregoing, an object of the present invention is to provide a mounting structure of electrical equipment favorable in mountability while suppressing the dimension in height direction.

A mounting structure of electrical equipment according to the present invention includes a casing having at least 6 faces for storing the electrical equipment per se, and holding means for holding the bottom of the casing on the floor panel of a vehicle. The electrical equipment per se has a shape of an approximate rectangular parallelepiped. The casing has a configuration in which, at the rearward position in the longitudinal direction of the vehicle, the top side of the casing extends further towards the rear of the vehicle than the bottom side of the casing.

When a large-volume battery pack of an approximate rectangular parallelepiped configuration formed of nickel metal hydride batteries, for example, is to be mounted as electrical equipment on a vehicle in accordance with the present invention, the casing storing the battery pack (the battery pack and casing are referred to as battery assy) has an inclination in which the top side extends further towards the rear of vehicle than the bottom side at the rearward position of the vehicle. By virtue of the inclination, the battery assy, when mounted in the luggage room, will not become an obstacle during the loading and unloading of a spare tire (tempa spare wheel) that is disposed further backward than the battery assy. When the battery assy is mounted beneath the front seat, space is established around the toes of the rider on the rear seat by virtue of the inclination. The feet of the rider on the rear seat will not be obstructed by the battery assy. Inside the battery assy, space is established between the battery pack having the shape of a rectangular parallelepiped and the casing having an inclination. This space can be used as the chamber or channel of a cooling medium (air), so that the dimension in height direction will not be increased. As a result, a mounting structure of electrical equipment having further favorable mountability while suppressing the dimension in height direction can be provided.

Preferably, the casing has a configuration in which, at the frontward position of the vehicle in the longitudinal direction, the bottom side of the casing extends further towards the front of the vehicle than the top side.

In accordance with the present invention, the casing storing the battery pack has, at the frontward position of the vehicle in the longitudinal direction, an inclination in which the bottom side extends further towards the front of the vehicle than the upper side. In the case where this battery assy is mounted in the luggage room, this inclination can be set along the partition panel inclined towards the rear of the vehicle. Therefore, the battery assy can be mounted with no dead space at the front side of the vehicle as compared to a casing of a conventional rectangular parallelepiped. In the case where the battery assy is mounted beneath the front seat, the inclination can be set along the seat mounting bracket inclined towards the rear of the vehicle. Therefore, the battery assy can be mounted on the vehicle with no dead space, as compared to a casing of a conventional rectangular parallelepiped. Inside the battery assy, two gaps are formed at the frontward position and rearward position of the vehicle, between the rectangular parallelepiped battery pack and the casing having an inclination. Since the gaps can be employed as the chamber or channel for the cooling medium (air), the dimension, particularly in the direction of height, will not be increased. As a result, a mounting structure of electrical equipment having further favorable mountability while suppressing the dimension in height direction can be provided.

The cross section of the casing, when viewed from the side of the vehicle, is preferably an approximate parallelogram with a horizontal base.

Since a battery pack having a cross section that is an approximate rectangle is stored in a casing having a cross section that is an approximate parallelogram in accordance with the present invention, a gap is formed between the oblique side of the parallelogram and the shorter side of the battery pack. The gap can be employed as the chamber or channel of a cooling medium (air).

Further preferably, the electrical equipment is stored in the casing such that the bottom of the casing is not parallel to the bottom of the electrical equipment per se.

Since a battery pack having a cross section of an approximate rectangle, for example, is stored in an inclined manner in a casing having a cross section of an approximate parallelogram in accordance with the present invention, a gap is formed at the upper region and the lower region, in addition to the gaps at the frontward and rearward positions of the vehicle established between the oblique side of the parallelogram and the shorter side of the battery pack. The gap can be used as the channel of a cooling medium (air) communicating with the chamber.

Furthermore preferably, a duct for cooling the electrical equipment is provided at the void that is established as a result of the bottom of the casing not being parallel to the bottom of the electrical equipment per se.

Since a duct for cooling the electrical equipment is provided at the void between the casing having a cross section of an approximate parallelogram and a battery pack having a cross section of an approximate rectangle, a cooling medium (air) can be delivered by pressure application through the duct.

Further preferably, the duct is formed of resin.

Since the duct is formed of resin in the present invention, molding is facilitated. Further, when stress is generated at the battery pack due to collision or the like of the vehicle, the resin duct can absorb the stress to alleviate the impact on the battery pack, and to prevent shorting caused by contact between the casing (metal) and the terminal of the battery pack.

Further preferably, the electrical equipment is stored in the casing such that, when viewed from the side of the vehicle, an end at the top of the electrical equipment per se is brought into contact with one end side of the casing at the top, whereas an end at the bottom of the electrical equipment per se is brought into contact with another end side of the casing, differing from the one end side of the casing, at the bottom of the casing.

When viewed from the side of the vehicle in accordance with the present invention, a gap is formed that gradually expands from one end side to another end side at the top of the casing, whereas a gap is formed that gradually expands from the another end side towards the one end side at the bottom of the casing. When the cooling air flow is conducted from the upper side towards the lower side or from the lower side to the upper side of the battery pack, pressure loss can be suppressed to allow sufficient amount of cooling air up to the downstream side since the cross section of the conduit at the gap employed as a conduit gradually expands.

Further preferably, the electrical equipment is stored in the casing such that, when viewed from the side of the vehicle, the cross section of the electrical equipment per se is an approximate rectangle, and the base of the parallelogram is not parallel to the base of the rectangle.

Since a battery pack having a cross section of an approximate rectangle is stored in an inclined manner in a casing having a cross section of an approximate parallelogram in accordance with the present invention, a gap is formed at upper region and lower region of the vehicle, in addition to the gap at the frontward position and rearward position of the vehicle established between the oblique side of the parallelogram and the shorter side of the battery pack. This gap can be employed as the channel of a cooling medium (air) communicating with the chamber.

Further preferably, a duct for cooling the electrical equipment is provided between a gap of the approximate parallelogram and the approximate rectangle.

Since the duct for cooling the electrical equipment is provided at the gap between the approximate parallelogram and the approximate rectangle in accordance with the present invention, a cooling medium (air) can be delivered by pressure application through the duct.

Further preferably, the electrical equipment is stored in the casing such that, when viewed from the side of the vehicle, an end of the upper side of the approximate rectangle is brought into contact with one end side of the approximate parallelogram at the upper side whereas an end of the approximate rectangle at the lower side is brought into contact with another end side, differing from the one end side, of the approximate parallelogram at the lower side.

When viewed from the side of the vehicle in accordance with the present invention, a gap is formed that gradually expands from one end side to another end side at the top of the casing corresponding to an approximate parallelogram, whereas a gap is formed that gradually expands from the another end side towards the one end side at the bottom of the casing. When the cooling air flow is conducted from the upper side towards the lower side or from the lower side to the upper side of the battery pack, pressure loss can be suppressed to allow sufficient amount of cooling air up to the downstream side since the cross section of the conduit at the gap employed as a conduit gradually expands.

Further preferably, the electrical equipment includes any of a secondary battery, capacitor, and fuel cell.

The present invention is advantageous in that there is no dead space, the spare tire can be loaded/unloaded without obstruction, and the feet of the rider on the rear seat is not obstructed even when the secondary battery, capacitor, fuel cell, and the like are accommodated.

Further preferably, the electrical equipment is mounted in the luggage room.

In the case where the battery assy identified as the electrical equipment is mounted in the luggage room in accordance with the present invention, loading/unloading of a spare tire (tempa spare wheel) disposed further backward of the vehicle than the battery assy is not obstructed by the battery assy by virtue of the inclination. Since the battery assy can be mounted with the inclination set along the partition panel inclined towards the rear of the vehicle, the battery assy can be mounted at the frontward position of the vehicle with no dead space, as compared to a casing of a conventional rectangular parallelepiped.

Further preferably, the electrical equipment is mounted beneath the front seat.

In the case where the battery assy identified as the electrical equipment is mounted beneath the front seat in accordance with the present invention, a gap can be formed at the leading end of the rider's feet on the rear seat by virtue of the inclination. The battery assy will not obstruct the feet of the rider at the rear seat. Furthermore, since the battery assy can be mounted with the inclination set along the seat mounting bracket inclined towards the rear of the vehicle, the battery assy can be mounted on the vehicle with no dead space, as compared to a casing of a conventional rectangular parallelepiped.

BEST MODE FOR CARRYING OUT THE INVENTION

An embodiment of the present invention will be described hereinafter with reference to the drawings. In the following, corresponding components have the same reference characters allotted. Their designation and function are also identical. Therefore, details of the description thereof will not be repeated. Although the embodiment will be described based on a battery assy as the electrical equipment in the following, the electrical equipment may be a capacitor, fuel cell, PCU, or the like other than a battery assy. Furthermore, the type of battery in the battery pack constituting the battery assy may be, but is not particularly limited to, a lead storage battery, lithium-ion battery, and nickel metal hydride battery. In the following, a secondary battery (nickel metal hydride battery) is envisaged.

Figure 1:
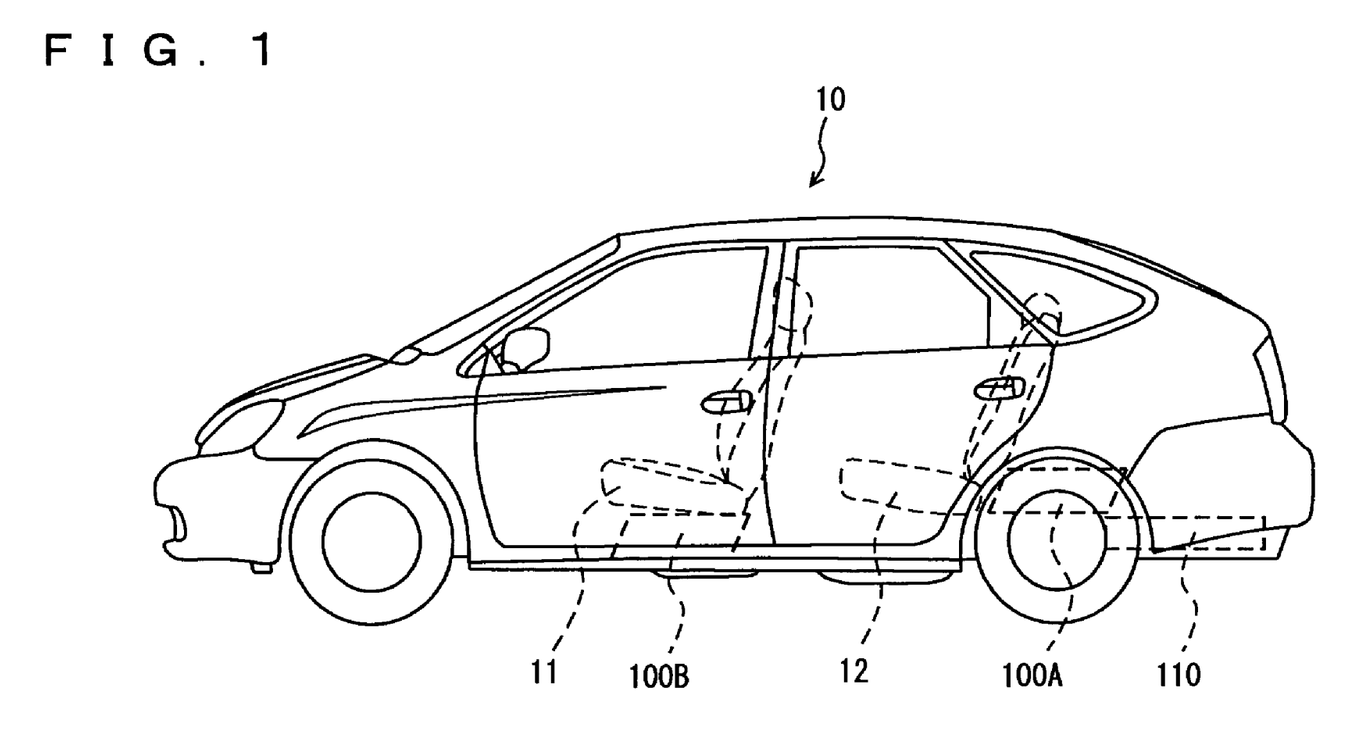
FIG. 1 is a side view of a vehicle on which a battery assy according to an embodiment of the present invention is mounted.
Figure 2:
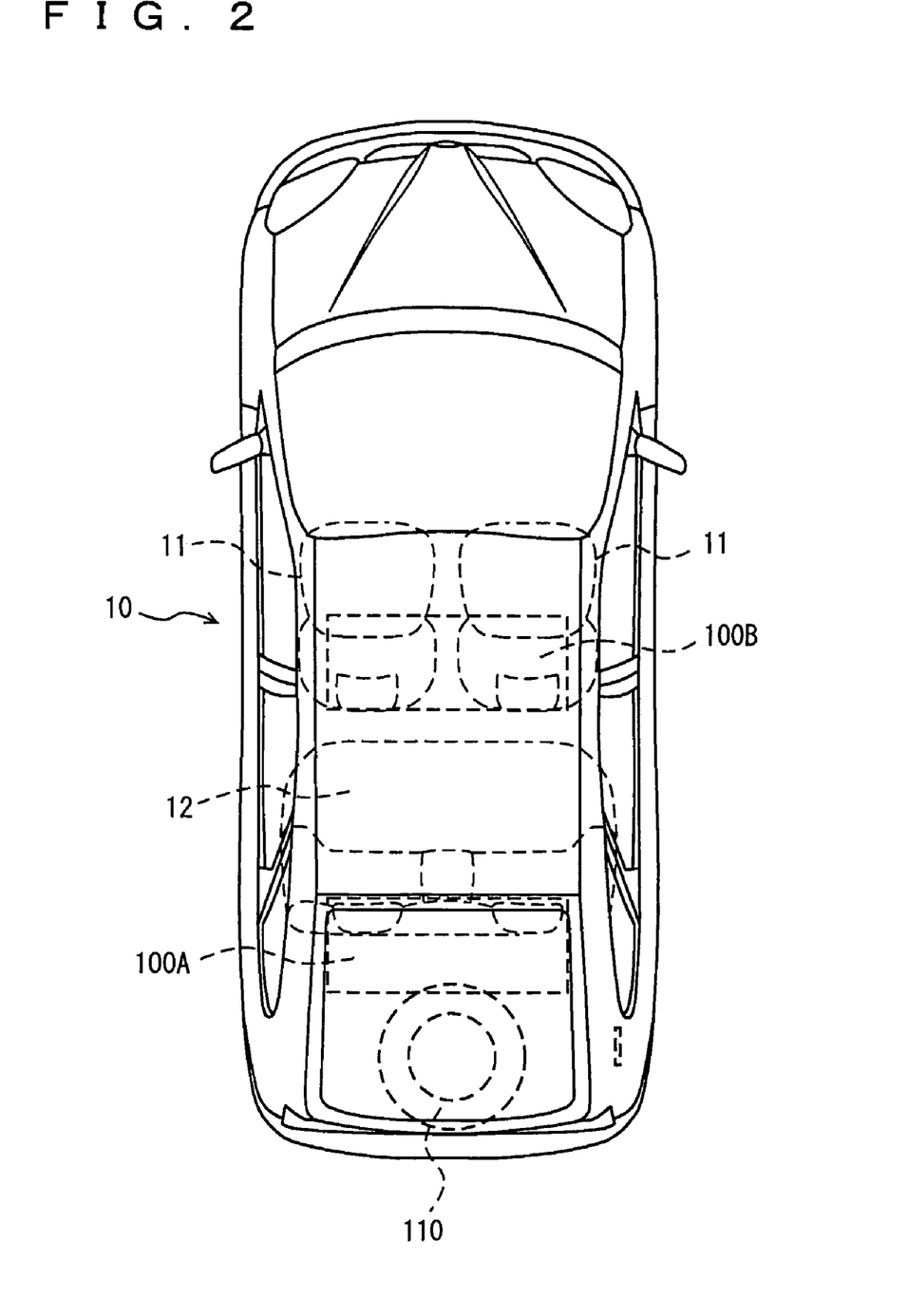
FIG. 2 is a top view of a vehicle on which a battery assy of the present embodiment is mounted.

Referring to FIGS. 1 and 2, a vehicle 10 has a battery assy 100A mounted on the top surface of the luggage room floor, behind a rear seat 12, or a battery assy 100B mounted on the top surface of the floor seat, beneath a front seat. Any one or both of battery assy 100A and 100B can be mounted.

Battery assy 100A/100B stores a battery pack formed of a plurality of battery modules. Each module is formed of a plurality of battery cells. For example, 6 cells constitute 1 module, and 30 modules constitute one battery pack.

Figure 3:
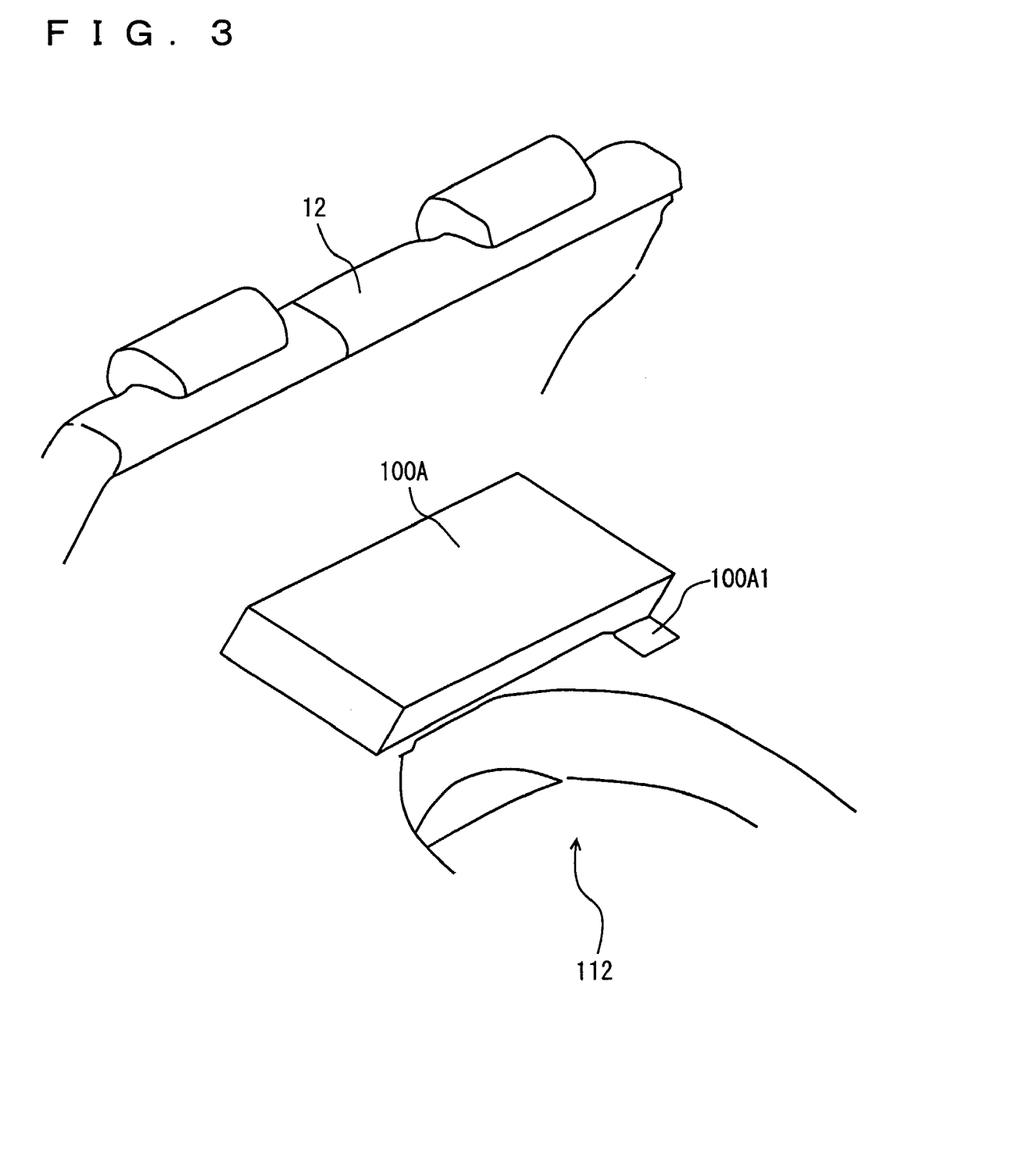
FIG. 3 is a perspective view of a battery assy mounted in a luggage room.

FIG. 3 is a perspective view of battery assy 100A mounted on the top surface of the luggage room floor behind rear seat 12. Battery assy 100A includes a stay 100A1 identified as a holding member to hold battery assy 100A on the luggage room floor. Using stay 100A1, the battery assy is fastened by a bolt or the like to be secured to the luggage room floor.

Battery assy 100A has the front portion in the longitudinal direction of the vehicle inclined along the inclination of a partition panel that is inclined towards the rear of the vehicle and located behind rear seat 12. A spare tire storage compartment 112 is provided behind battery assy 100A.

Figure 4:
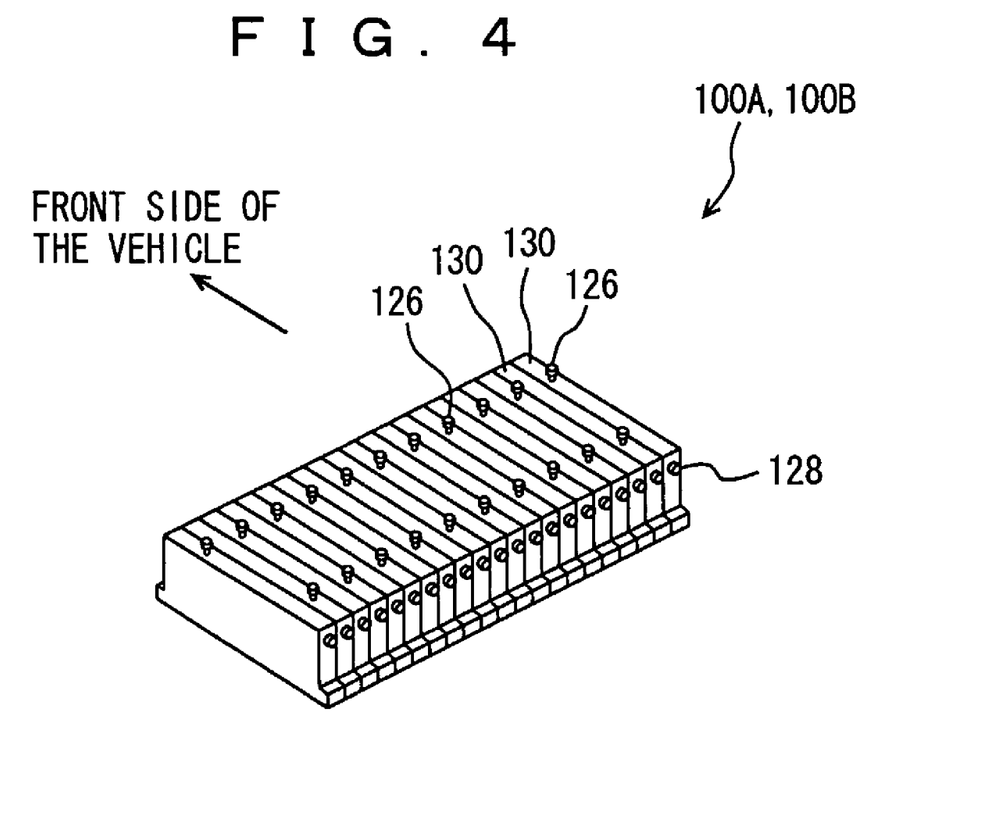
FIG. 4 is a perspective view of a battery pack.
Figure 5:
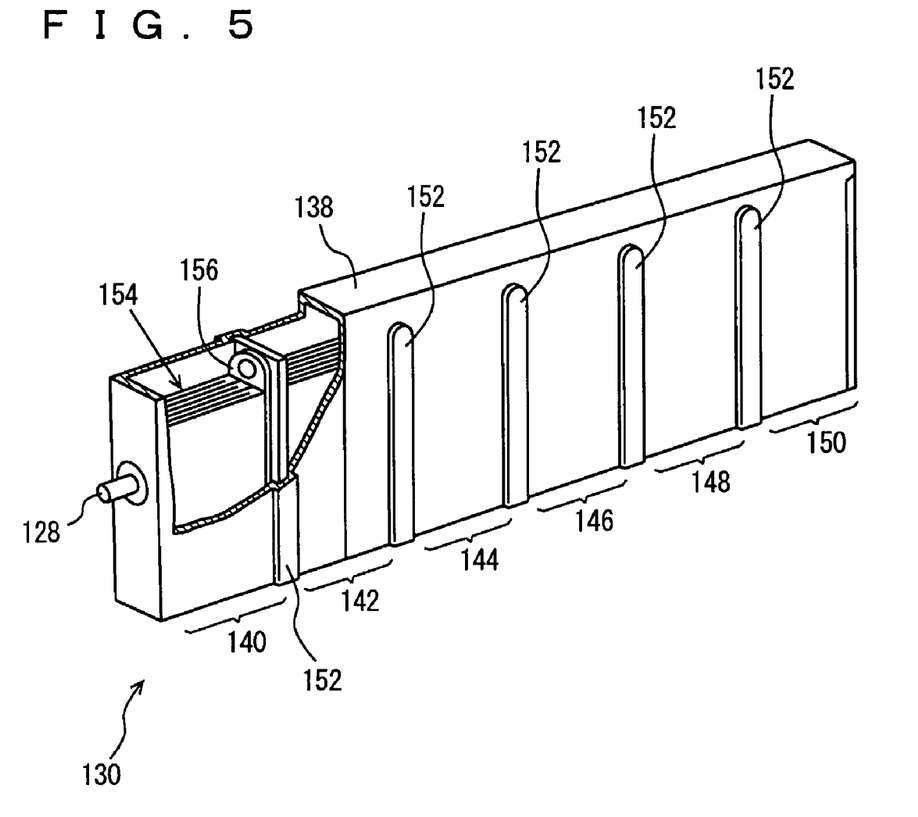
FIG. 5 is a perspective view of a battery module constituting the battery pack of FIG. 4.

FIG. 4 is a perspective view of battery module 130 constituting a battery pack arranged in battery assy 100A and 100B of FIG. 3. FIG. 5 is a perspective view of battery module of FIG. 4.

FIG. 4 shows a structure in which the battery pack is stored in a casing formed of a battery cover and a lower case. As will be described afterwards, the cross section of the casing formed of a battery cover and lower case, when viewed from the side of the vehicle, is an approximate parallelogram. A plurality of battery modules 130 are stacked in the direction of width of the vehicle to constitute a battery pack. Battery module 130 can employ a secondary battery such as a nickel metal hydride battery, as set forth above. Battery module 130 has the so-called block type plate profile.

Battery module 130 includes a plurality of battery cells. Specifically, as shown in FIG. 5, battery module 130 includes an integral block type cell 138 identified as the module outer member, and 6 battery cells 140-150 partitioned by respective walls in block type cell 138. A terminal 128 is formed on the end plane of block type cell 138 in the longitudinal direction. On the side plane of block type cell 138 is formed a projection 152 to establish a gap as a cooling air flow channel between battery modules 130. In the battery pack including a stack of battery modules 130, a gap is formed between adjacent battery modules through the abutment between respective projections 152 of adjacent battery modules 130, and/or abutment between projection 152 and the wall of battery module 130. In FIG. 5, an exhaust terminal 126 is not depicted, and block type cell 138 is illustrated with a portion removed for the sake of describing battery cells 140-150.

Each of battery cells 140-150 basically has the same configuration. A first battery cell 140 representative thereof includes a layered electrode unit 154 formed of a plurality of electrode member sheets stacked on each other in an insulative state with a separator therebetween, and a pair of collector plates 156 arranged so as to sandwich layered electrode unit 154. Layered electrode unit 154 is immersed with or filled with an electrolyte.

Layered electrode unit 154 has a plurality of electrode members identified as the cathode and a plurality of electrode members identified as the anode, which are alternately layered. The electrode members identified as the cathode all have their ends connected to one collector plate 156. The electrode members identified as the anode all have their ends connected to the other collector plate (not shown). As a result, all the electrode members corresponding to the cathode are electrically connected to one collector plate 156, whereas all the electrode members corresponding to the anode are electrically connected to the other collector plate. Battery cells 140-150 in battery module 130 are electrically connected in series. For example, when the rated voltage of each of battery cells 140-150 is 1.2V, the entire rated voltage of battery modules 130 is 7.2V. The configuration of battery cells 140-150 is not limited to that described above, and a different configuration may be employed.

A restrain plate is arranged at both ends of the battery pack. The restrain plates are connected and secured to each other through a restrain pipe. The restrain plate is secured to the lower case to which each of battery module 130 is fastened. It is to be noted that battery module 130 is fixed in an inclined manner with respect to the lower case, as will be described afterwards.

On the side face (end plane) of each battery module 130 constituting the battery pack is formed a terminal 128 for input/output current with respect to battery module 130, as set forth above. A bus bar module is arranged on the side face of the battery pack for the purpose of connecting terminal 128 of battery module 130 with each other. By the connection of the bus bar module with terminal 128 of each battery module 130, battery modules 130 are electrically connected in series in the battery pack.

On the top surface of battery pack is formed an exhaust terminal 126 with a built-in safety valve to discharge at one time hydrogen gas and the like output from battery module 130. An exhaust hose is arranged on exhaust terminal 126. The exhaust hose is connected to exhaust terminal 126 to discharge outside of battery assay 100A and 100B hydrogen gas and the like output from battery module 130. A temperature sensor and harness to measure the temperature of the battery pack are arranged at the bottom surface of the battery pack. Cooling air is supplied from the interior of the vehicle towards the battery pack through a blower fan to maintain the temperature of the battery pack in a predetermined range according to the output of the temperature sensor.

The provision of projection 152 at battery module 130 allows a void to be formed between battery modules 130 by means of projection 152 therebetween when battery modules 130 are disposed as shown in FIG. 4. Through this gap is conducted a cooling air flow from the upper side towards the lower side of battery module 130 (down flow system). Battery module 130 is cooled by this cooling air.

A predetermined number of battery modules 130 having an approximate rectangular parallelepiped configuration are stacked in the width direction of the vehicle inside the battery cover of battery assy 100A/100B.

Figure 6:
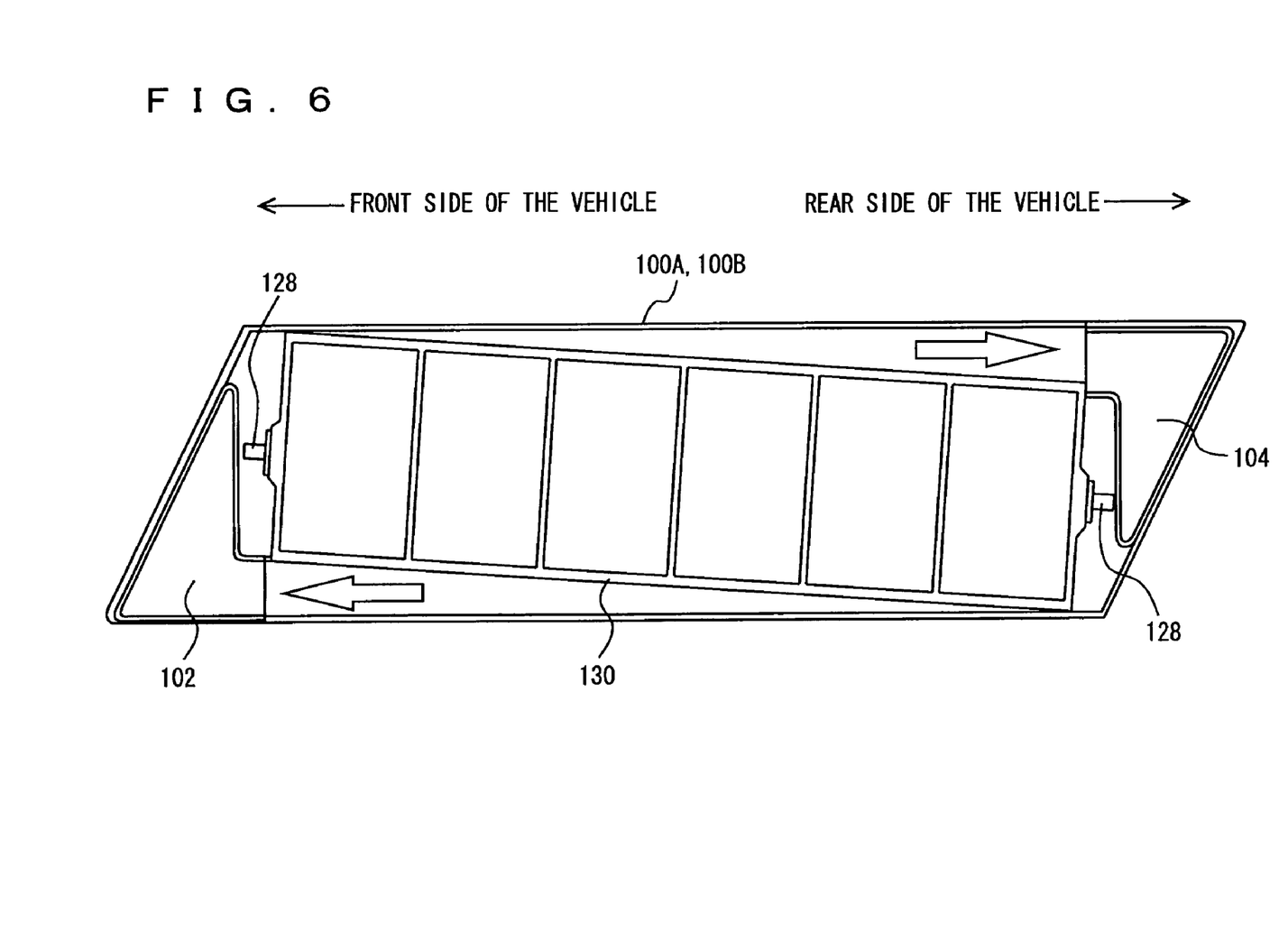
FIG. 6 is a sectional view of a battery assy according to an embodiment of the present invention.

FIG. 6 is a sectional view of battery assy 100A/100B according to the present invention. Since battery module 130 is substantially a rectangular parallelepiped with the exception of the projection of terminal 128, the cross section of battery module 130 is substantially a rectangle. The battery cover and lower case identified as the casing of battery assy 100A/100B has a cross section of an approximate parallelogram. The inclination of the casing at the front side of the vehicle is set along the inclination of the partition panel provided behind the rear seat.

Since the casing has a cross section of substantially a parallelogram and battery module 130 has a configuration of substantially a rectangle, a gap is formed at the front side and the rear side of the vehicle. A first chamber 102 (front side of vehicle) and a second chamber 104 (rear side of the vehicle) formed of resin are installed in these gaps. First and second chambers 102 and 104 are hollow in the piercing direction of the paper plane of the drawing to allow air flow in the direction of piercing the paper plane of the drawing. The air flowing into second chamber 104 is supplied above battery module 130 by a cooling fan or the like to pass through the gaps between battery modules 130 in a down flowing manner to enter first chamber 102 from the bottom of battery module 130, and is then discharged to the interior or exterior of the vehicle. This stream of flow is merely exemplary, and an opposite stream of flow may be conducted.

Battery module 130 having a cross section of an approximate rectangle is fixed in an inclined manner in the casing that has a cross section of an approximate parallelogram. Therefore, respective gaps are formed above and below battery module 130 in the casing. These gaps function as a channel of cooling air. As shown in FIG. 6, battery assy 100A/100B and battery module 130 are arranged such that battery module 130 is inclined. Specifically, the two ends of battery module 130 (the end at the front side of the vehicle and the end at the rear side of the vehicle) are brought into contact with the inner walls of the top and bottom of battery assy 100A/100B. In the example of FIG. 6, an end at the top of battery module 130 forms contact with the inner wall at the top of battery assy 100A/100B, at the frontward position of the vehicle, whereas an end at the bottom of battery module 130 forms contact with the inner wall of the bottom of battery assy 100A/100B, at the rearward position of the vehicle. An opposite configuration thereof is allowed.

With the inclination and contact set forth above, battery module 130 is stored in battery assy 100A/100B. When viewed from the side of the vehicle as shown in FIG. 6, a gap that gradually expands from the front side towards the rear side of the vehicle is established at the upper region of battery assy 100A/100B, whereas a gap that gradually expands from the rear side of the vehicle to the front side of the vehicle is formed at the lower region of battery assy 100A/100B. At the gaps employed as the conduit to conduct the cooling air flow downwards or upwards in the battery pack at the upper region and lower region of battery assy 100A/100B, the cross sectional area of the conduit gradually expands. When a cooling air flow is conducted in the direction of the arrows in FIG. 6, high air pressure can be realized by the small cross sectional area of the conduit at the upstream side to allow battery module 130 to be cooled at high efficiency. At the downstream side where the cross sectional area of the conduit becomes larger, pressure loss is suppressed to ensure sufficient amount of cooling air even at the downstream side.

As shown in FIG. 6, terminal 128 abuts against or is located close to first chamber 102 or second chamber 104 formed of resin. Terminal 128 is protected by the resin chamber even if stress in the longitudinal direction of the vehicle is generated by collision of the vehicle. For example, the stress generated at battery module 130 through deformation of the chamber is absorbed. Therefore, short-circuiting caused by deformation of terminal 128 or contact with the casing will not occur.

Figure 7:
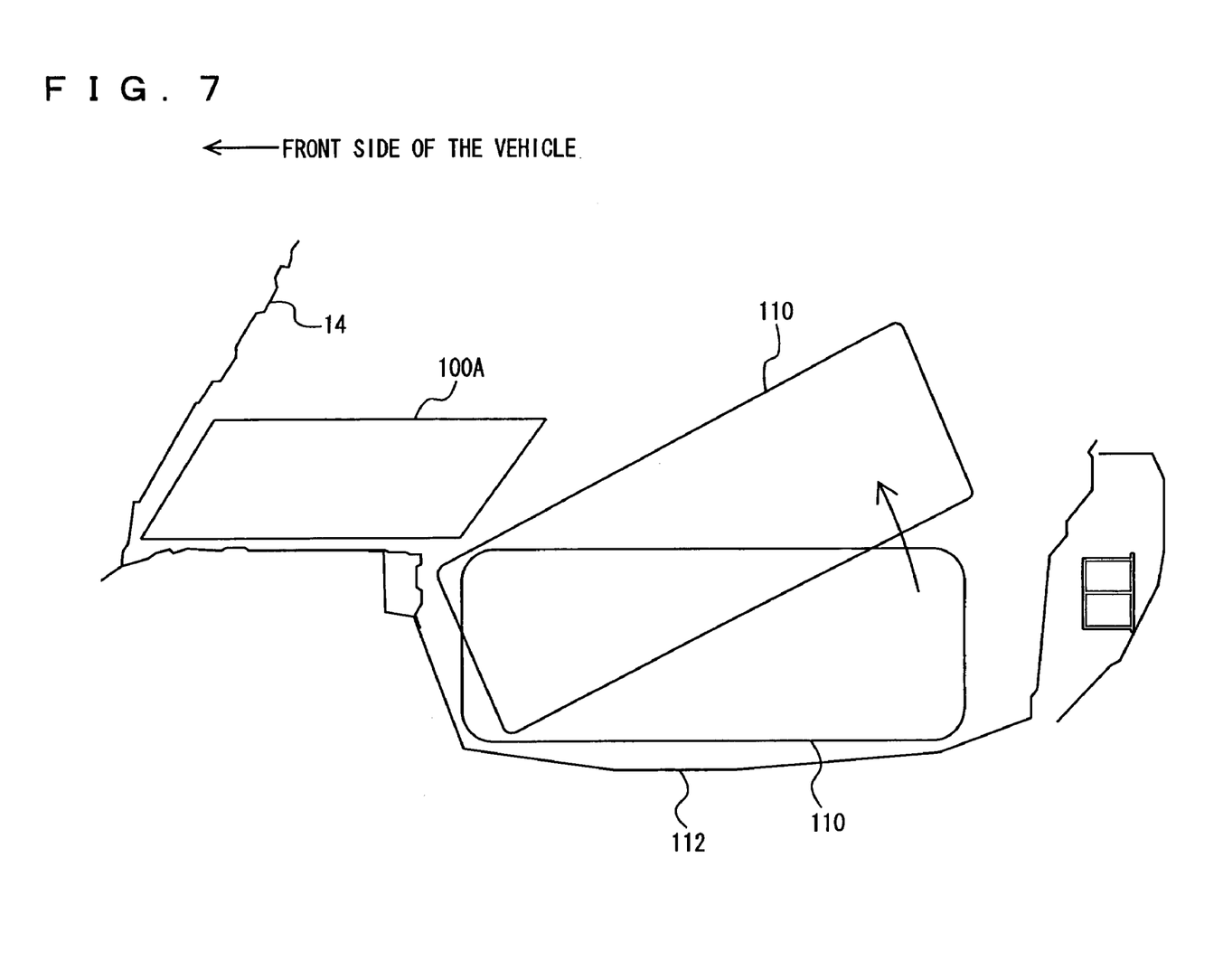
FIG. 7 is a side view of a battery assy mounted in a luggage room.

FIG. 7 is a side view of battery assy 100A mounted in the luggage room. The inclination of battery assy 100A at the frontward position of the vehicle corresponds to the inclination of partition panel 14. Therefore, battery assy 100A can be disposed further frontward in the vehicle, as compared to the case where battery assy 100A takes a rectangular parallelepiped configuration. Furthermore, battery assy 100A will not obstruct the unloading of a spare tire 100 (may be a tempa spare wheel) from spare tire storage compartment 112 by virtue of the inclination of battery assy 100A at the rear side. Therefore, a spare tire can be unloaded without the battery assy being an obstacle, as compared to the case where battery assy 100A takes a rectangular parallelepiped configuration.

Figure 8:
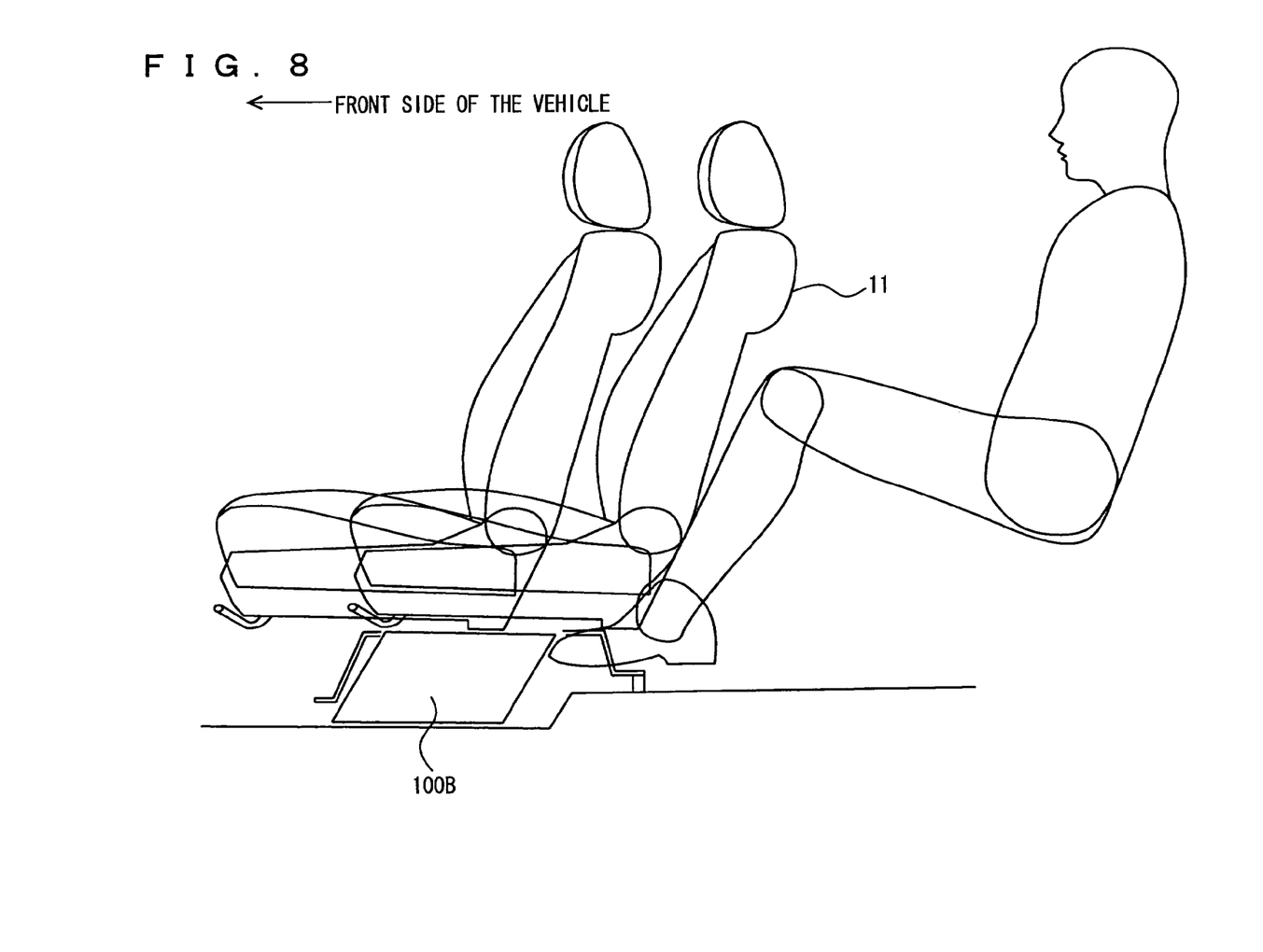
FIG. 8 is a side view of a battery assy mounted beneath a front seat.

FIG. 8 is a side view of battery assy 100B mounted beneath the front seat. When a rider is seated at the rear seat, there will be room around the toes of the rider by virtue of the inclination of battery assy 100B at the rear side in the vehicle. Therefore, the rider at the rear seat can rest his/her feet more comfortably by virtue of the inclination of battery assy 100B. Thus, battery assy 100B will not become an obstacle to the rider on the rear seat, as compared to the case where battery assy 100B takes a rectangular parallelepiped configuration.

By employing a casing having a cross section of a parallelogram to accommodate a battery pack, even when of a rectangular parallelepiped configuration, inclined with respect to the casing, resin chambers at the front side and rear side gaps of the vehicle are provided as well as the channels for the cooling air at the upper region and lower region of the casing. Accordingly, in the case where the battery assy is mounted in the luggage space behind the rear seat, it can be mounted further frontward in the vehicle as compared to the conventional case and will not obstruct unloading of a spare tire by virtue of the inclination at the front side of the casing. In the case where the battery assy is mounted beneath the front seat, the rider of the rear seat can rest his/her feet comfortably with more room by virtue of the inclination of the casing at the rear side of the vehicle.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A mounting structure of electrical equipment on a vehicle, comprising:
a casing having at least six faces for storing said electrical equipment, and
a holding unit for holding a bottom of said casing on a floor panel of said vehicle,
wherein said electrical equipment has a configuration of an approximate rectangular parallelepiped,
said casing has a configuration in which a top side of said casing extends further towards the rear of said vehicle than the bottom side, at a rearward position in a longitudinal direction of said vehicle, and said casing has a configuration in which the bottom side of said casing extends further towards the front of said vehicle than the top side, at a frontward position in the longitudinal direction of said vehicle,
a cross section of said casing, when viewed from a side of said vehicle, is an approximate parallelogram with a horizontal base,
said electrical equipment is stored in said casing such that the bottom of said casing is not parallel to the bottom of said electrical equipment,
in the casing where the bottom of said casing is not parallel to the bottom of said electrical equipment, gaps where cooling air for said electrical equipment flows are formed respectively between the upper side of said approximate parallelogram and said electrical equipment and between the lower side of said approximate parallelogram and said electrical equipment, and gaps where ducts for cooling said electrical equipment are provided are formed respectively between said electrical equipment and one of two sides, opposite to each other in the longitudinal direction, of said approximate parallelogram, and between said electrical equipment and the other side of said approximate parallelogram, and
said electrical equipment has a terminal for input and output of electric current, and said terminal abuts on said duct.

2. The mounting structure of electrical equipment according to claim 1, wherein said duct is formed of resin.

3. The mounting structure of electrical equipment according to claim 1, wherein said electrical equipment is stored in said casing such that, when viewed from the side of said vehicle,
an end at a top of said electrical equipment is brought into contact with one end side of said casing at the top, and
an end of the bottom of said electrical equipment is brought into contact with another end side of said casing, differing from said one end side, at the bottom.

4. The mounting structure of electrical equipment according to claim 1, wherein said electrical equipment is stored in said casing such that, when viewed from the side of said vehicle, said electrical equipment has a cross section of an approximate rectangle, and the base of said parallelogram is not parallel to the base of said rectangle.

5. The mounting structure of electrical equipment according to claim 4, wherein a duct to cool said electrical equipment is provided at a gap between said approximate parallelogram and said approximate rectangle.

6. The mounting structure of electrical equipment according to claim 5, wherein said duct is formed of resin.

7. The mounting structure of electrical equipment according to claim 4, wherein said electrical equipment is stored in said casing such that, when viewed from a side of said vehicle,
an end of said approximate rectangle at the upper side is brought into contact with one end side of said parallelogram at the upper side, and
an end of said approximate rectangle at the lower side is brought into contact with another end side of said parallelogram, differing from said one end side, at the lower side.

8. The mounting structure of electrical equipment according to claim 1, wherein said electrical equipment includes any of a secondary battery, capacitor and fuel cell.

9. The mounting structure of electrical equipment according to claim 1, wherein said electrical equipment is mounted in a luggage room.

10. The mounting structure of electrical equipment according to claim 1, wherein said electrical equipment is mounted beneath a front seat.

* * * * *